United States Patent
Takeuchi et al.

(10) Patent No.: US 6,243,531 B1
(45) Date of Patent: *Jun. 5, 2001

(54) RECORDING APPARATUS CAPABLE OF RECORDING MOTION IMAGE AND STILL IMAGE

(75) Inventors: Yoshitaka Takeuchi, Tokyo; Akihiro Oishi, Kunitachi, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/715,392

(22) Filed: Sep. 13, 1996

(30) Foreign Application Priority Data

Sep. 14, 1995 (JP) .................................................. 7-236864
Oct. 3, 1995 (JP) .................................................. 7-256351
Nov. 28, 1995 (JP) .................................................. 7-309309

(51) Int. Cl.[7] .............................. H04N 5/91; H04N 5/225
(52) U.S. Cl. .................................... 386/108; 386/121
(58) Field of Search ................................ 386/38, 95, 117, 386/120, 121, 83, 108, 61; 358/906, 909.1; 348/220, 232, 334

(56) References Cited

U.S. PATENT DOCUMENTS

| 5,034,804 | * | 7/1991 | Sasaki et al. | 348/232 |
| 5,159,461 | * | 10/1992 | Fujimoto | 358/909.1 |
| 5,202,798 | * | 4/1993 | Takei et al. | 358/909.1 |
| 5,371,602 | * | 12/1994 | Tsuboi et al. | 386/95 |
| 5,541,656 | * | 7/1996 | Kare et al. | 348/334 |
| 5,546,191 | * | 8/1996 | Hibi et al. | 386/83 |
| 5,589,943 | * | 12/1996 | Kozuki et al. | 386/121 |
| 5,835,663 | * | 11/1998 | Momochi | 386/61 |

* cited by examiner

Primary Examiner—Wendy R. Garber
Assistant Examiner—Luong Nguyen
(74) Attorney, Agent, or Firm—Fitzpatrick, Cella, Harper & Scinto (57) ABSTRACT

A motion image and a still image are selectively recorded onto a recording medium. When the recording of the still image is instructed during the recording of the motion image, one picture plane in the motion image is extracted and stored into a memory. After completion of the recording of the motion image, the image data of one picture plane stored in the memory is repeatedly read out and recorded as a still image. A continuity of motion images to be reproduced is held and a reproduction image of a high picture quality is obtained.

17 Claims, 8 Drawing Sheets

RECORDING APPARATUS CAPABLE OF RECORDING MOTION IMAGE AND STILL IMAGE

BACKGROUND OF THE INVENTION

1. Field of the Invention

The present invention relates to a recording apparatus and, more particularly, to an apparatus which can record a motion image and a still image.

2. Related Background Art

As such a kind of apparatus, hitherto, a digital VTR for recording and reproducing a digital signal onto/from a magnetic tape by rotary heads has been known. In such a digital VTR, there is known a digital VTR using a method of encoding a motion image signal in a picture plane unit, for example, in each frame unit and sequentially recording the encoded signals onto the tape.

When the motion image signal recorded by the above method is printed, displayed, or the like as a still image, one picture plane of a reproduction image is fetched into a memory and is repeatedly outputted from the memory, thereby enabling the still image to be obtained.

In this instance, there are problems such that an image which is displayed by an interlace scan of a television image is disturbed by a flicker, an outline portion of the image is not smooth due to an influence by a scanning line, further, a still image cannot be completely reproduced because of an error or drop-out upon reproduction, and the like.

In order to obtain a still image of a higher quality, therefore, it can be considered to record a still image of one frame by repeatedly recording a number of times corresponding to a plurality of picture planes during the recording of motion images.

Figure 1:
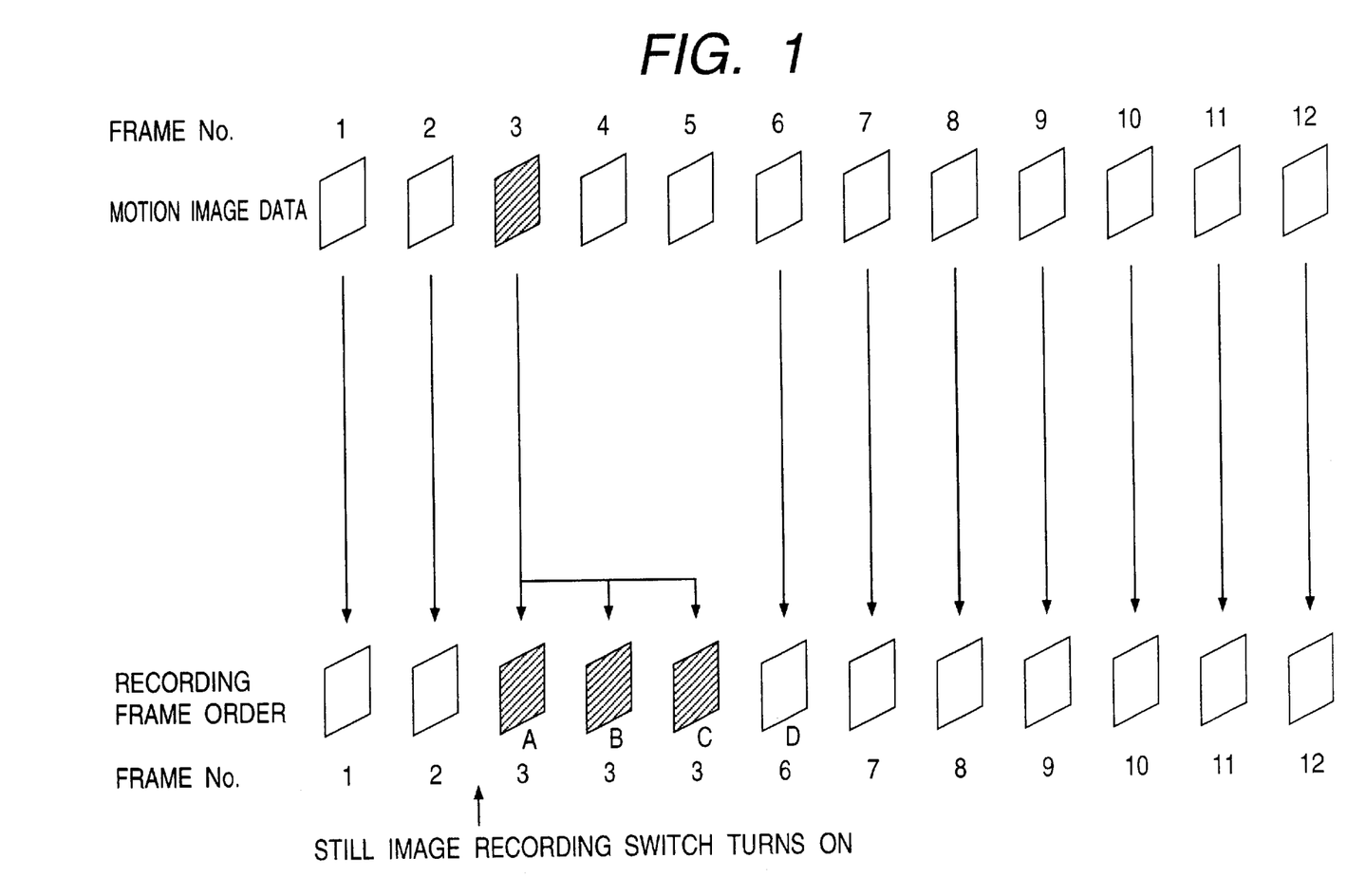
FIG. 1 is a diagram showing a state of the recording of still images.

FIG. 1 shows a state where a still image signal of one frame is recorded into areas of three frames of a motion image on a tape.

In the diagram, when a picture which is desired to be recorded as a still image appears during the recording of the No. 2 frame, by instructing the recording of the still image using a still image recording switch, the recording of the still image is started from a position A of the No. 3 frame.

After the No. 3 frame was recorded at the position of A, a similar signal of one frame is repeatedly recorded to positions corresponding to portions B and C.

After the still images of the three frames were recorded, the No. 6 frame of the motion image is recorded in a portion corresponding to a frame of D and, subsequently, the motion image is continuously recorded.

When the still image is recorded during the recording of the motion image as mentioned above, the frames of Nos. 4 and 5 of the motion image corresponding to a period of the recording of the still images B and C are not recorded.

When the motion images recorded as mentioned above are reproduced, a problem occurs such that a continuity of the pictures is lost and the reproduction image is disturbed.

When an image is reproduced from a recording medium on which the motion and still images have mixedly been recorded as mentioned above, it can be considered that the still image is suddenly reproduced during the reproduction of the motion image, so that it is not pleasant when the reproduction image is watched.

SUMMARY OF THE INVENTION

It is an object of the invention to solve the foregoing problems.

It is another object of the invention to keep continuity of motion images which are reproduced and to obtain a high-quality reproduction image even when a still image is recorded during the recording of a motion image.

Under such objects, as an embodiment according to the invention, there is provided a recording apparatus comprising: (a) recording means for recording image data onto a recording medium; (b) memory means for storing the image data; (c) instructing means for instructing a recording of a still image; and (d) control means for controlling the recording means and the memory means in a manner such that image data of one picture plane in motion image data is extracted in accordance with an instruction by the instructing means during the recording of the motion image data and is stored into the memory means and the image data stored in the memory means is recorded onto the recording medium in accordance with the end of the recording of the motion image data by the recording means.

Another object of the invention is to improve a picture quality of a recorded motion image in a reproducing mode without deteriorating the picture quality of a recorded still image upon reproduction in the case where the still image is recorded during the recording of the motion image onto a recording medium.

Another object of the invention is to prevent an inconvenience such that a more important scene in a series of motion images cannot be recorded as a still image when the above function is realized.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will now be described hereinbelow in detail with reference to the drawings.

Figure 2:
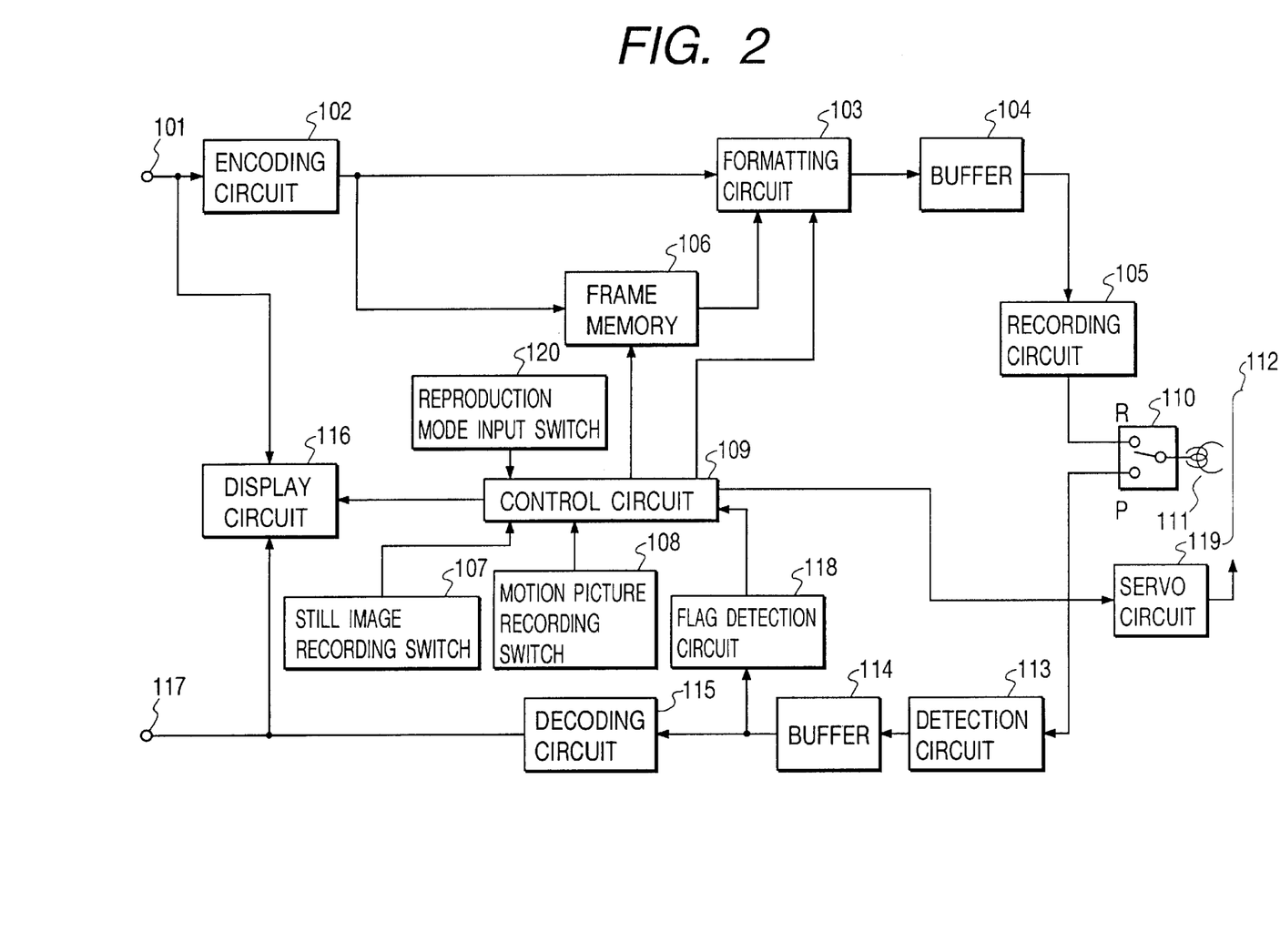
FIG. 2 is a diagram showing a structure of a digital VTR as an embodiment of the invention.
Figure 4:
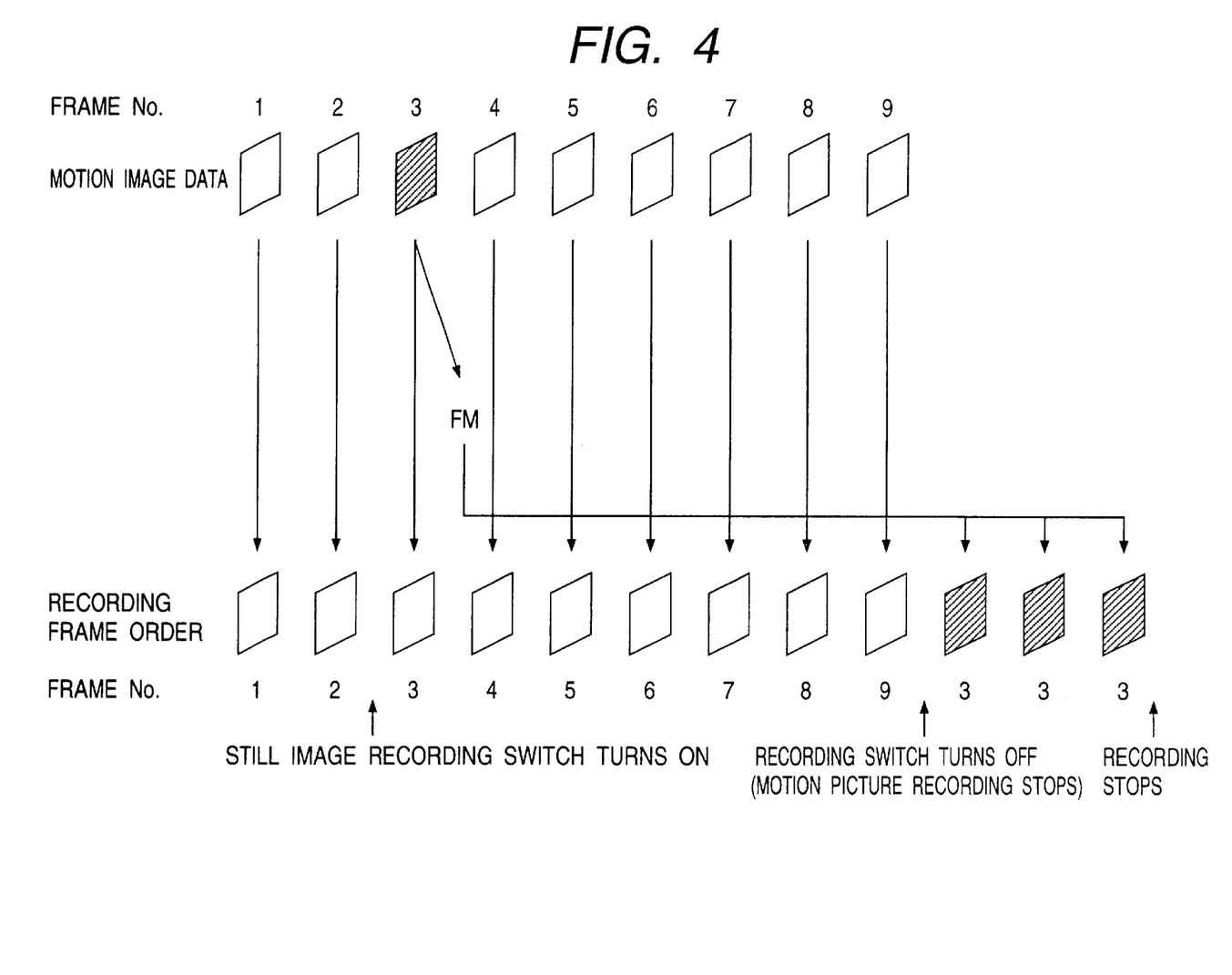
FIG. 4 is a diagram showing a state of the recording of still images in the embodiment of the invention.

FIG. 2 is a block diagram showing a structure of a digital VTR according to an embodiment of the invention. In the embodiment, as shown in FIG. 4, when a picture which is desired to be recorded as a still image is selected during the recording of a motion image, the picture is once stored into a memory. After the recording of the series of motion images is stopped, the stored picture is read out from the memory and a still image signal is continuously recorded by an amount corresponding to three frames, thereby holding a continuity of the motion images during such a reading operation while continuously recording the still images as many as three frames.

In FIG. 2, when a motion picture recording switch 108 is operated, a control circuit 109 starts to feed a tape 112 by a servo circuit 119. A digital image signal which is obtained by a video camera or the like and supplied from an input terminal 101 is encoded into blocks and by using an image signal in the same frame in an encoding circuit 102 by a well-known technique such as DCT, quantization, or the like, thereby compressing an information amount of the digital image signal. In case of the ordinary recording of motion images, the encoded image signal is generated as it is to a formatting circuit 103 and is converted to a signal in a predetermined format together with other data such as ID data, subcode, and the like. The converted signal is outputted to a recording circuit 105 via a buffer 104, is converted to a signal in a format adapted to a magnetic recording, and is recorded onto the magnetic tape 112 by a head 111 through a switch 110.

A motion image during the recording is displayed by a display circuit 116, so that the user can select the still image to be recorded while watching the image of the display circuit 116. That is, when a still image recording switch 107 is operated just before the No. 3 frame which is desired to be recorded as a still image during the recording of the motion image, the control circuit 109 controls a memory 106 in accordance with the operation of the still image recording switch 107, thereby allowing the encoded data of the No. 3 frame to be written into the frame memory 106.

The subsequent motion image signals of the frames including the No. 3 frame are also continuously recorded for a time interval of the above operation. Further, when the still image recording switch 107 is operated, while continuously recording the motion images, the control circuit 109 generates a still image recording flag indicating that the still image has been recorded and outputs the flag to the formatting circuit 103. The still image recording flag is recorded together with the motion image to a track in which the motion image has been recorded.

When the stop of the recording of the motion image is instructed by the motion picture recording switch 108, the recording of the motion image is stopped by stopping the supply of the motion image signal to the formatting circuit 103. The control circuit 109 controls the memory 106, repeatedly reads out the image signal of the No. 3 frame which has been stored in the frame memory 106, outputs the signals to the formatting circuit 103, and continuously records the signals as still images by an amount corresponding to three frames subsequent to the motion images.

The control circuit 109 generates a still image flag indicating that the image data of the No. 3 frame which is recorded as a still image is a still image, outputs the flag to the formatting circuit 103, and records it together with the image data of the No. 3 frame to each track of the tape 112.

During the above operation, the tape 112 is continuously fed. When the recording of the still images of three frames is finished, the control circuit 109 stops the feeding of the tape 112 by the servo circuit 119.

Figure 3:
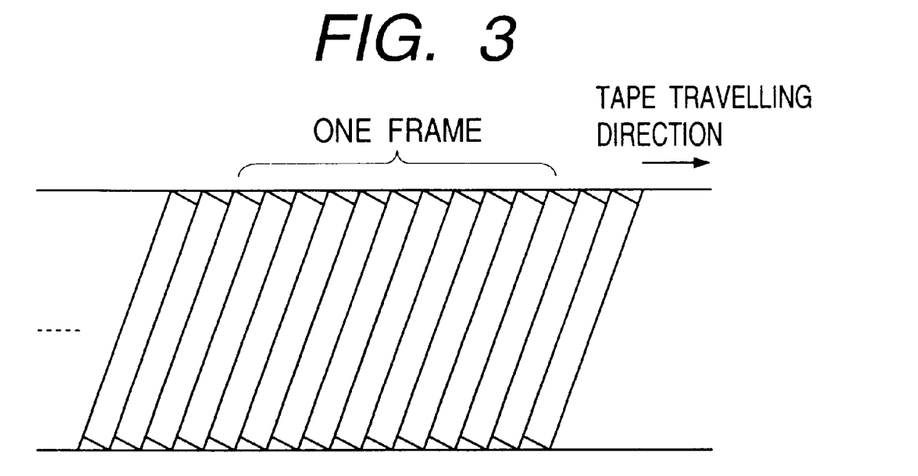
FIG. 3 is a diagram showing states of tracks which are formed on a tape by the apparatus of FIG. 2.

In the format on the tape as shown in FIG. 3, one frame is recorded in 10 tracks. The still image recording flag is recorded to each of the 10 tracks to which the motion image of each frame is recorded for tens of frames after the motion image of the frame recorded when the still image recording switch 107 is operated.

The operation upon reproduction will now be described.

When a normal reproducing mode is instructed by a reproducing mode input switch 120, the original digital data of the image signal reproduced by the head 111 from the tape 112 to which the motion image and still image have been recorded is detected by a detection circuit 113 and is outputted to a buffer 114. The buffer 114 outputs the reproduction data to a decoding circuit 115 and a flag detection circuit 118.

The decoding circuit 115 executes processes opposite to those in the recording mode to the reproduction data outputted from the buffer 114, converts it to the original image data, and outputs the original image data to an output terminal 117 and the display circuit 116. The display circuit 116 displays an image according to the reproduction image data in the reproducing mode.

Figure 5:
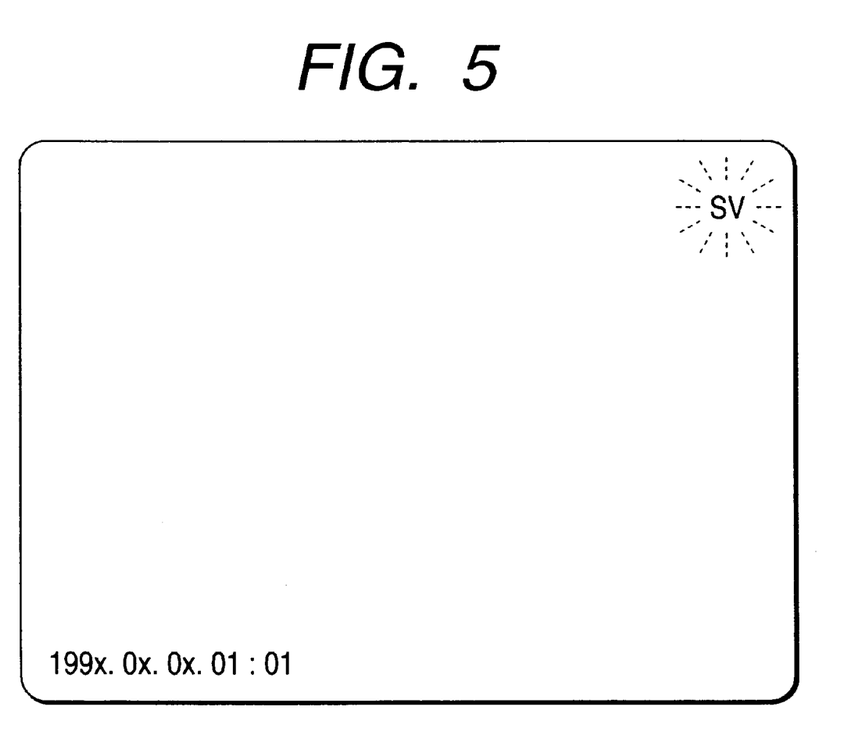
FIG. 5 is a diagram showing a state when a motion image recorded by the apparatus of FIG. 2 is reproduced.

When the still image recording flag recorded together with the motion image in association with the recording of the still image as mentioned above is detected during the reproduction of the motion image, the flag detection circuit 118 outputs a signal indicative of such a fact to the control circuit 109. The control circuit 109 controls the display circuit 116 in accordance with the still image flag so as to display a message indicating that the still image is recorded after the motion image which is at present being reproduced for a predetermined time during the reproduction of the motion image as shown in FIG. 5.

When the still image flag which has been recorded together with the still image (No. 3 frame) as mentioned above is detected by the flag detection circuit 118, the control circuit 109 stops the feeding of the tape 112 by the servo circuit 119.

When a still image search mode for retrieving the still image and reproducing only the still image is selected by the mode input switch 120, the control circuit 109 controls the servo circuit 119 so as to feed the tape at a high speed until the still image flag is detected.

When the still image flag is detected, the still image signal is reproduced and decoded by the decoding circuit 115. The image data after the decoding is stored into a memory (not shown) in the decoding circuit 115 and is repeatedly read out from the memory, thereby reproducing the still image. After that, when the reproduction of the next still image is instructed, a portion in which the next still image has been recorded is automatically retrieved. In this instance, the travelling of the tape can be stopped or the next still image can be retrieved during the reproduction of the still image.

In addition, various modes such as a mode for cross-fading the still image and motion image and the like can be considered.

According to the embodiment as mentioned above, when the No. 3 frame is used as a still image and still images corresponding to three frames are recorded as shown in FIG. 4, the encoded data of the frame which is recorded as a still image is once stored into the memory. After the recording of the motion image was finished, the stored data is read out from the memory and recorded. Thus, the motion image and the still image can be separately recorded. All of the motion image signals which are inputted for a period of time during which the same frame is repeatedly recorded in FIG. 1 can be recorded.

Since the still image recording flag indicating that the still image has been recorded is generated in accordance with an instruction of the still image recording and is recorded together with the motion image, by detecting such a flag upon reproduction of the motion image and displaying such a fact, the user can preliminarily know that the still image corresponding to the motion image at a time point when the display is performed has been recorded.

Further, according to the embodiment, since the still image is recorded at the time of changing scenes of the motion images, the still image is not inserted in the middle of the series of motion images in the reproducing mode.

Another embodiment of the invention will now be described.

In the embodiment as well, a still image is recorded by the method as shown in FIG. 4.

Figure 6:
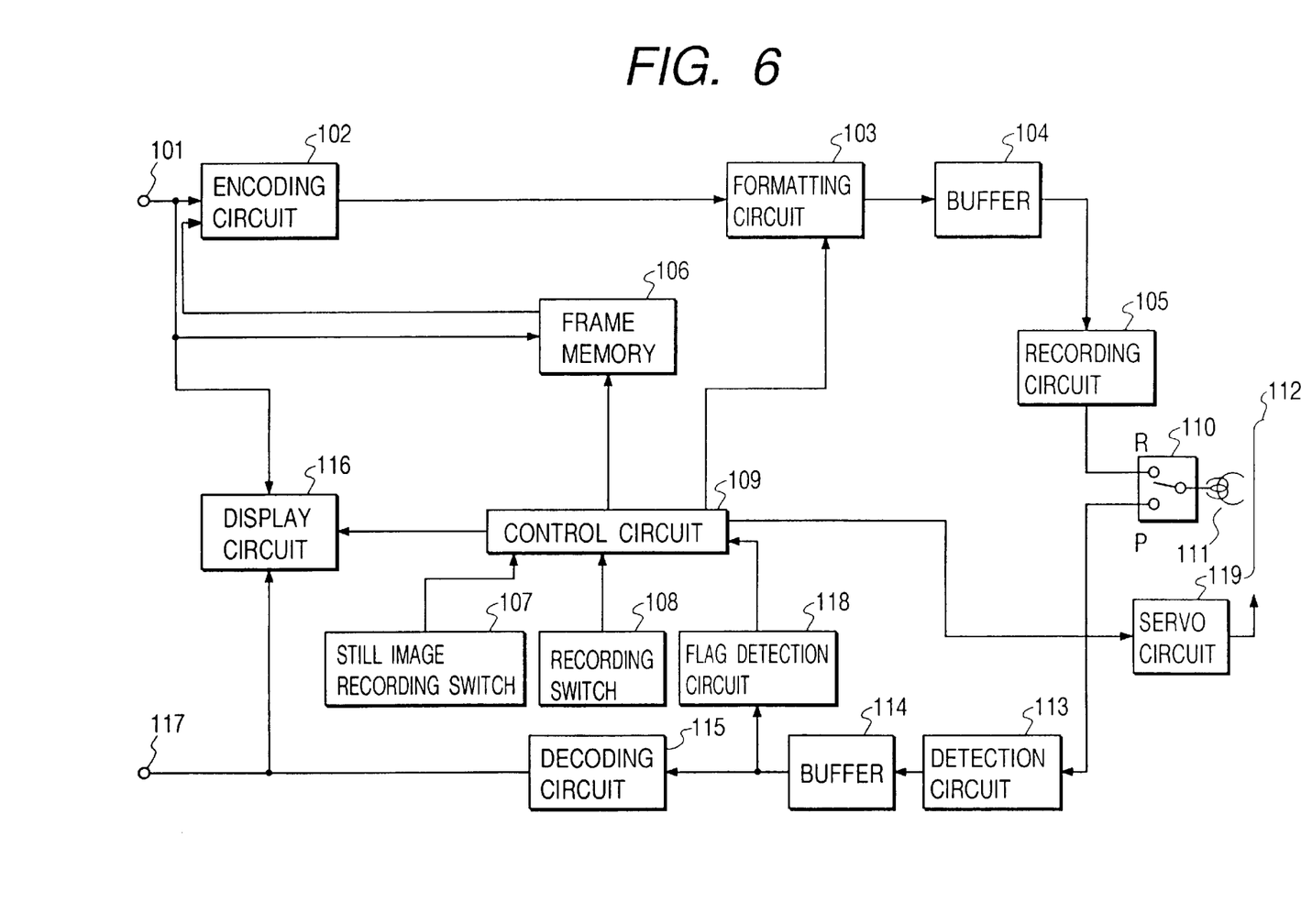
FIG. 6 is a diagram showing another structure of the digital VTR as an embodiment of the invention.

FIG. 6 is a diagram showing a structure of a digital VTR according to the embodiment. It is different from the apparatus of FIG. 2 with respect to a point that the image signal before it is compressed and encoded by the encoding circuit 102 is stored into the frame memory 106.

According to such a structure, since the information amount of the image signal which is stored into the memory is larger than that of the case of FIG. 2, although a necessary capacity of the memory increases, the encoding method can be switched to an encoding method adapted to the still image or an encoding method adapted to the motion image in the encoding circuit.

For example, a quantization coefficient is reduced upon encoding of the still image, a compression ratio is reduced, and a higher-precision image can be also recorded.

Although the intraframe encoding for encoding by using only the image signals in the same frame has been executed as an encoding in the foregoing embodiment, the invention is not limited to such an encoding. An interframe encoding for encoding by using image signals of a plurality of continuous frames, an interfield encoding for encoding by using image signals of a plurality of fields, or the like can be also used.

Further another embodiment of the invention will now be described.

Figure 7:
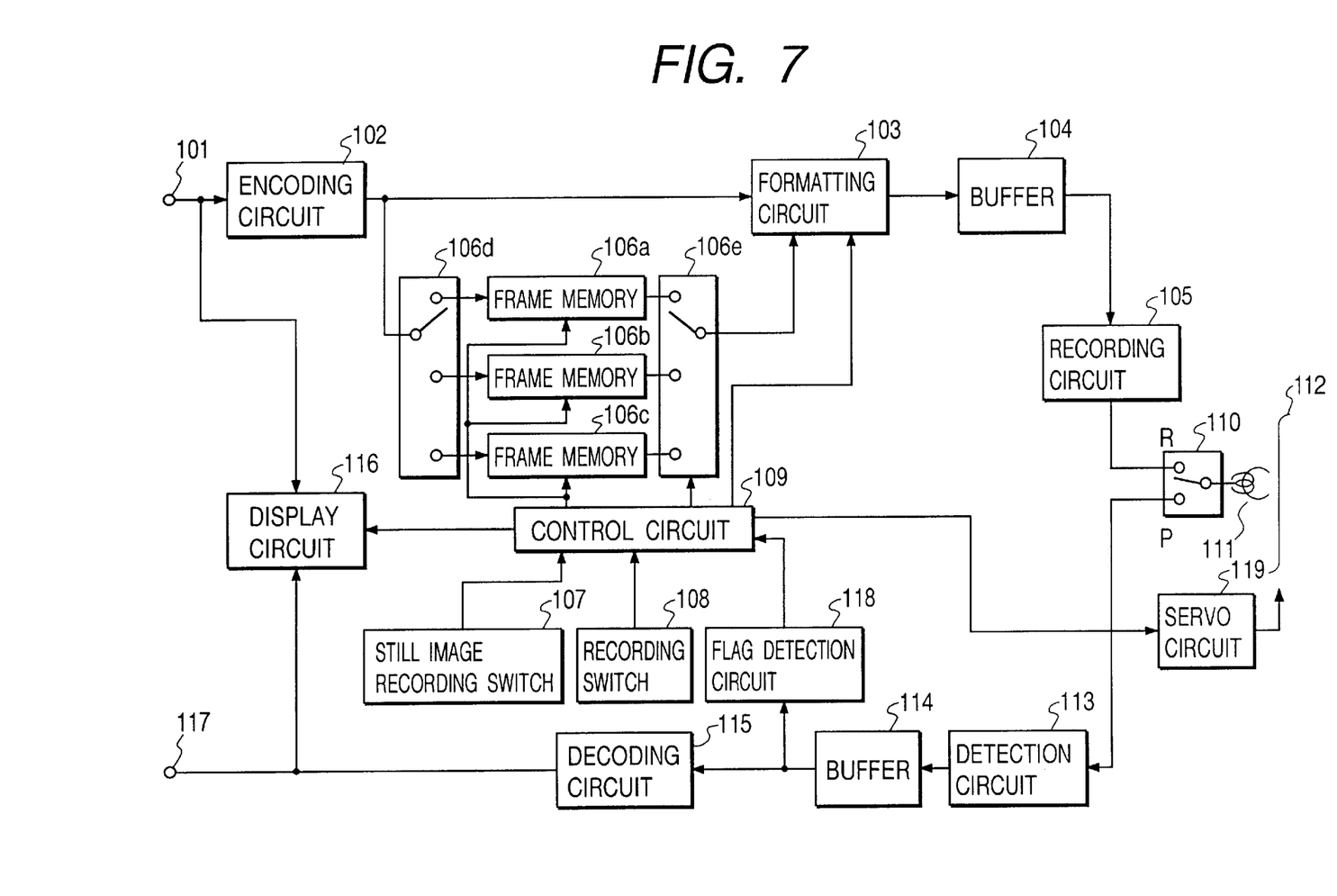
FIG. 7 is a diagram showing still another structure of the digital VTR as an embodiment of the invention.

FIG. 7 is a diagram showing a structure of a digital VTR according to the embodiment of the invention.

In the embodiment, still image signals of three frames are inserted and recorded during the recording of motion image signals in accordance with the order of the frames shown in FIG. 4 and all of the motion image signals which are inputted during the recording of the still image signals of three frames are also recorded.

In the embodiment, in a manner similar to the foregoing embodiment, the encoded and formatted image signal is recorded onto the tape 112 by the head 111 via the recording circuit 105 and the switch 110 in the ordinary recording mode of the motion image.

The recording operation of the still image in the embodiment will now be described. In the embodiment, when the still image recording switch 107 is operated just before the No. 3 frame in FIG. 4 during the recording of the motion image, the control circuit 109 controls the formatting circuit 103 in accordance with the operation of the switch 107 and repeatedly continuously outputs the data of the No. 3 frame which is recorded as a still image to the buffer 104 by an amount corresponding to three frames. The No. 3 frame is, therefore, continuously and repeatedly recorded onto the tape by an amount corresponding to three frames.

The control circuit 109 generates the abovementioned still image flag in accordance with the operation of the switch 107 and records the still image flag into a track just before the image of the No. 3 frame is recorded, that is, a track to which the image of the No. 2 frame is recorded.

Further, with respect to the motion image signals of No. 4 frame and subsequent frames, the control circuit 109 sequentially writes the motion image signals of the Nos. 4, 5, and 6 frames into frame memories 106a, 106b, and 106c by switching a switch 106d in accordance with the operation of the switch 107.

After the image signal of the No. 3 frame that is recorded as a still image was recorded by an amount corresponding to four frames, the image data of the Nos. 4 to 6 frames recorded in the frame memories 106a to 106c is sequentially outputted to the formatting circuit 103 via a switch 106e which is switched by the control circuit 109, and is formatted.

Further, motion image signals of the No. 7 frame and subsequent frames are also similarly formatted and recorded with a delay of two frames by sequentially repeatedly writing and reading the image data to/from the frame memories 106a to 106c by switching each of the switches 106d and 106e.

Figure 8:
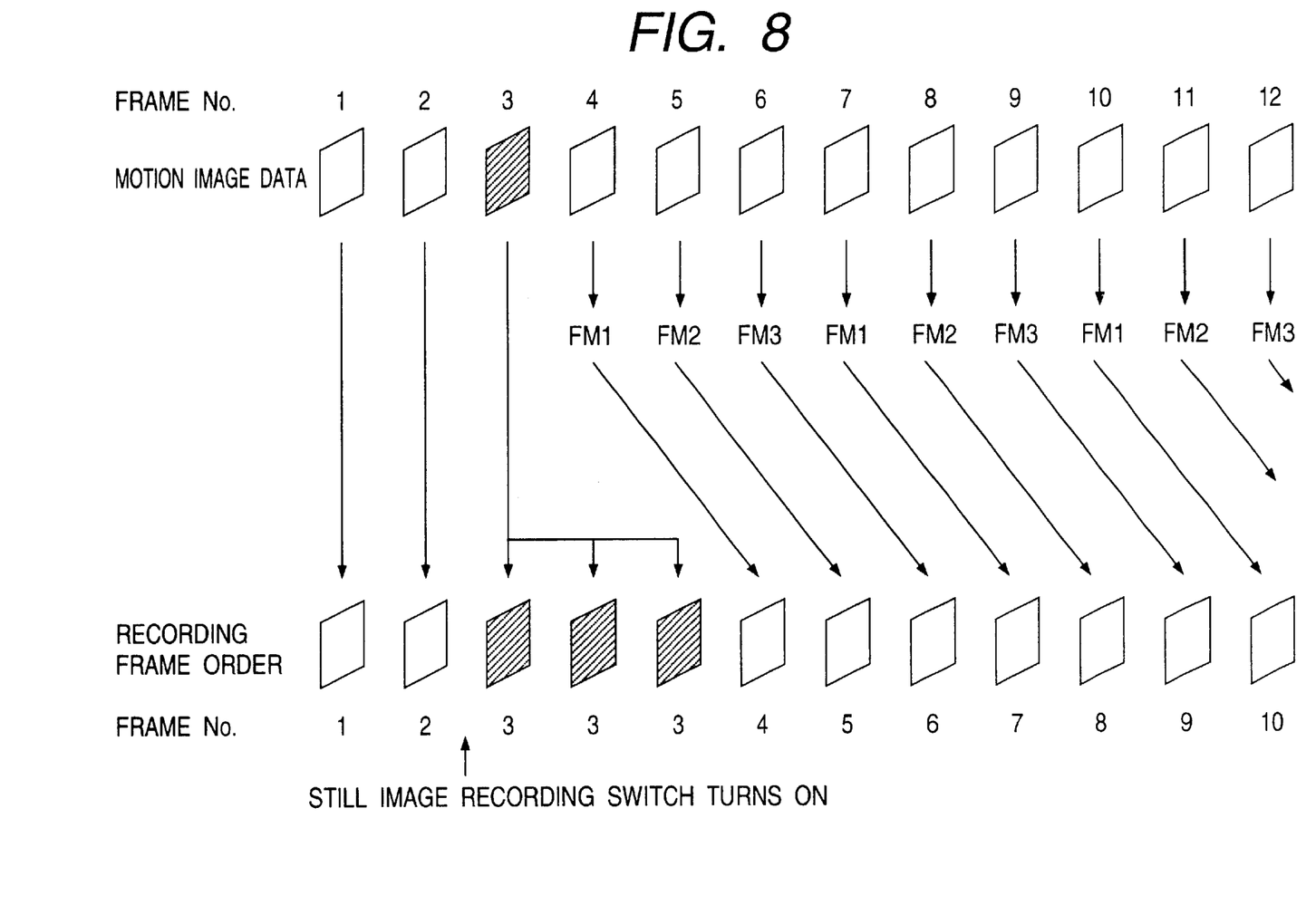
FIG. 8 is a diagram showing a state of the recording of still images by the apparatus of FIG. 7.

In the embodiment as mentioned above, as shown in FIG. 8, when the No. 3 frame is recorded as a still image by an amount corresponding to three frames, the motion image signals which are inputted after the frame to which the signal is recorded as a still image and subsequent frames are stored in the memory and delayed by a time corresponding to two frames. Thus, all of the motion image signals which are inputted for a period of time during which the same frame is repeatedly recorded can be recorded.

Although the reproducing operation is basically similar to that of the foregoing embodiment, in the embodiment, it is necessary to pay attention to a point that the still image is recorded during the series of motion images.

That is, when the still image flag is detected by the still image flag detection circuit 118, by inhibiting the reading of the image signals of two frames among the image signals of three frames recorded as still images from the buffer memory 114, the continuity of the reproduction motion images can be held. The control circuit 109 allows the display circuit 116 to display a message indicating that the still image has been recorded, so that the motion images displayed by the display circuit 116 are continuously displayed. However, the user can also know that the still image has been recorded.

Although the still image is recorded at a time point when the recording of the motion image is completed in the embodiment shown in FIG. 2, by reading out the image signal from the frame memory 106 and recording at an arbitrary position of the motion image which is inputted, the still image can be recorded at a desired position of the user.

As a display by the display circuit indicating that the still image has been recorded, it is not limited to the display as shown in FIG. 5 but any display can be used as long as the user can confirm that the still image has been recorded.

Further another embodiment of the invention will now be described.

The structure of the apparatus as shown in FIG. 2 is also used in the embodiment.

As mentioned above, during the recording of the motion image, the image data inputted from the digital image data input terminal 101 is also sent to the display circuit 116 and is displayed. The user can consequently monitor the motion image which is being recorded.

Although not shown, the image data inputted from the digital image data input terminal 101 is subjected to a predetermined signal process by a signal processing circuit and is inputted to the display circuit 116. In place of performing the signal process to the image data which is inputted from the digital image data input terminal 101 and supplying the processed data to the display circuit 116, it is also possible to construct in a manner such that the image data which is outputted from the buffer 114 is decoded by the decoding circuit 115 and is supplied to the display circuit 116.

When the user operates the still image recording switch 107 to record a desired scene as a still image among the motion images monitored during the recording operation of the motion image, the control circuit 109 obtains the number of remaining frames of the still images which can be recorded in the memory 106 for still image.

When the obtained number of remaining still images which can be recorded is not equal to a negative value, the number of still images which can be recorded is outputted to the display circuit 116 as will be described hereinafter and the image data of one frame (No. 3 frame) which is outputted from the encoding circuit 102 is stored into the memory 106 for still image.

The subsequent operation is substantially the same as that of the foregoing embodiment described with reference to FIG. 2.

In the embodiment as mentioned above, the memory 106 for still image is used as a memory for temporarily storing the still image data. Since the memory capacity of the memory 106 for still image is limited, the total number of still images which can be recorded during the recording operation of the motion image is, therefore, limited to a value within a predetermined number.

If no countermeasure is adopted, consequently, there occurs a situation such that when the user tries to record an important scene as a still image, no more still image can be already stored into the memory 106 for still image. In order to prevent such an inconvenience, in the embodiment as mentioned above, the number of still images which can be stored in the memory 106 is calculated by the control circuit 109 and is displayed by the display circuit 116.

A description will now be made hereinbelow with reference to FIG. 9.

Figure 9:
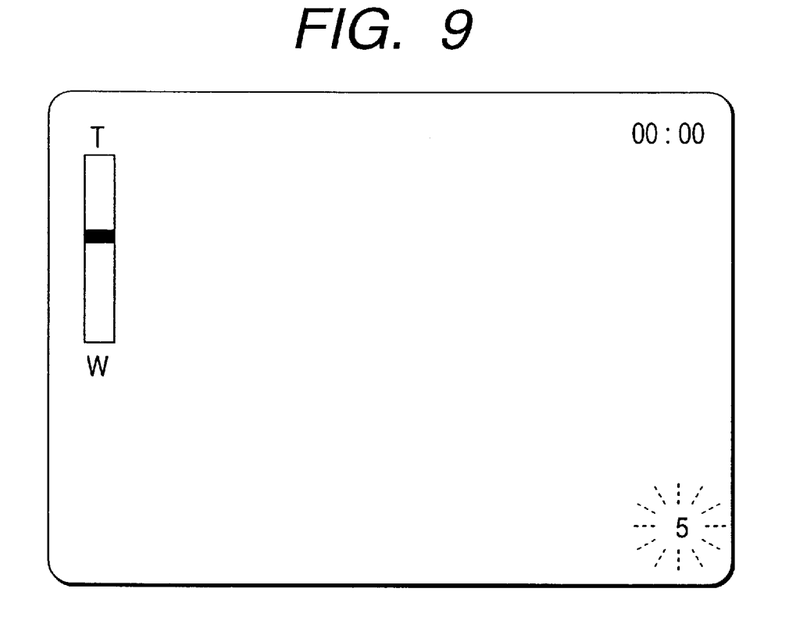
FIG. 9 is a diagram showing a state when a still image of a display circuit of the apparatus of FIG. 2 is recorded.

FIG. 9 is a diagram showing an image of a picture plane of a view finder displayed by the display circuit 116.

As shown in FIG. 9, the display circuit 116 displays the number of still images which can be stored into the memory 106 (the maximum number of still images which can be recorded) to a lower right portion of the picture plane on the basis of a signal indicative of the number of recordable still images that is supplied from the control circuit 109.

That is, when the user operates the still image recording switch 107 once during the recording of the motion image, the motion image data is recorded as it is to the tape 112 and the image data of the frame when the still image recording switch 107 is depressed is stored as a still image into the memory 106 for still image. The usable memory capacity in the memory 106 for still image is accordingly reduced.

The control circuit 109, therefore, subtracts only "1" from the previous number of remaining recordable still images and outputs the number after the substraction as a new number of remaining recordable still images to the display circuit 116. The display circuit 116 displays the number of remaining recordable still images after the substraction as shown in FIG. 9. The display position of the number of remaining recordable still images is not limited to the lower right portion of the picture plane, but any position is possible. The number of remaining still images which can be recorded is not necessarily an absolute value.

Since the number of still images which can be stored into the memory 106 for still image is displayed in the embodiment as mentioned above, the user can know the number of remaining recordable still images by seeing the display. Thus, by adjusting the number of recording times of the still image while watching the display contents, the inconvenience such that the more important scene cannot be recorded as a still image can be prevented.

Another embodiment of the invention will now be described.

In the embodiment as well, the structure of the apparatus shown in FIG. 2 is used. Detailed description of the structure of the apparatus of FIG. 2 is omitted here.

The embodiment is characterized in that when the still image recording switch 107 is operated during the recording of the motion image, the number of remaining still images which can be recorded into the memory 106 for still image is obtained. When the obtained number of remaining still images which can be recorded is equal to a predetermined number or less, an alarm signal is outputted to the display circuit 116.

Figure 10:
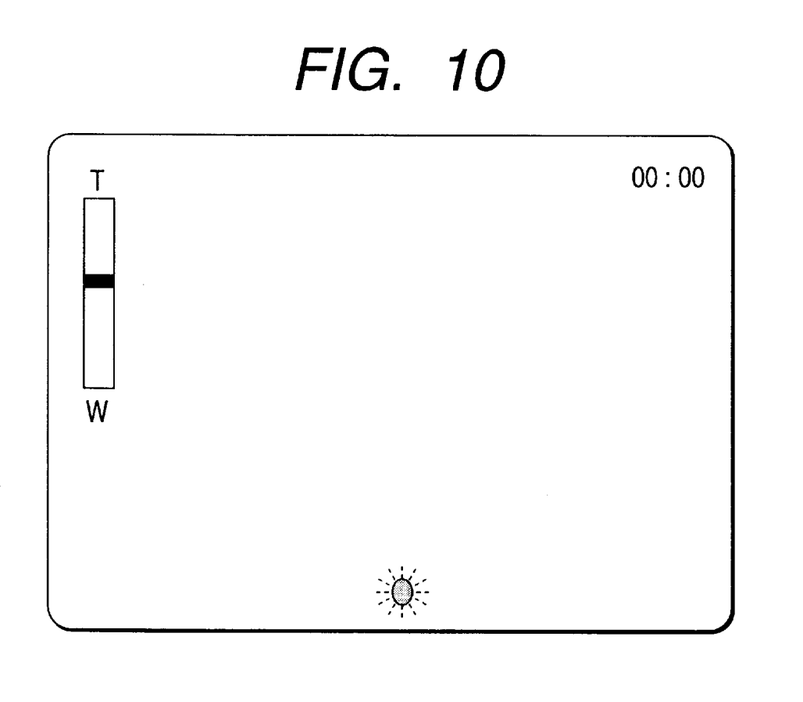
FIG. 10 is a diagram showing a state when a still image of the display circuit in the apparatus of FIG. 2 is recorded.

FIG. 10 is a diagram showing an image of a picture plane displayed by the display circuit 116 in the embodiment.

As shown in FIG. 10, the display circuit 116 displays an alarm lamp to a lower center portion of the picture plane on the basis of the alarm signal which is supplied by the control circuit 109 in order to notify the user of a fact that the number of remaining still images which can be recorded into the memory 106 for still image decreases.

That is, when the user operates the still image recording switch 107 once during the recording of the motion image, the motion image data is recorded as it is to the tape 112. The image data of the frame when the still image recording switch 107 is depressed is stored as a still image into the memory 106 for still image. Consequently, the usable memory capacity of the memory 106 for still image decreases.

When the user depresses the still image recording switch 107 a plurality of times and a plurality of still image data is stored into the memory 106 for still image, the number of remaining still images which can be recorded to the memory 106 for a still image is equal to a predetermined value or less at a certain stage. By lighting and displaying the alarm lamp as shown in FIG. 10 in this instance, the user is notified of the fact that the number of remaining recordable still images is equal to the predetermined value or less. The display position of the alarm lamp is not limited to the lower center portion of the picture plane but any position is possible.

In the embodiment as mentioned above, since the alarm lamp to notify the user of the fact that the number of remaining still images which can be recorded to the memory 106 for still image decreased is displayed, the user can know that the number of remaining still images which can be recorded is small by seeing the display. The number of recording times of the still images is, consequently, adjusted by watching the display contents, so that the inconvenience that the more important scene cannot be recorded as a still image can be prevented.

According to the embodiment as mentioned above, even when the recording of the still image is instructed during the recording operation of the motion image data, the motion image data can be recorded without losing its continuity. The picture quality, consequently, can be improved without causing an image to be disturbed upon reproduction of the motion image and still image which have been recorded.

The number of remaining still images which can be recorded into the memory for still image is displayed, or the alarm lamp is displayed when the number of remaining still images which can be recorded into the memory for still image is equal to the predetermined number or less. The user can, therefore, adjust the number of recording times and instructs the recording of the still image by seeing the display contents. It can be, therefore, prevented that the more important scene cannot be recorded during the recording of the still image, and the user can know the number of still images recorded during the recording of the motion images.

Since a mark indicating that the still image has been recorded is synthesized on the motion image data when the still image is recorded during the recording of the motion images, the synthesized mark can be also reproduced together with the motion image data when the motion image data is reproduced. The user can consequently know the portion where the still image recording has been performed upon reproduction of the motion image data.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording apparatus comprising:
    recording means for recording image data onto a recording medium;
    memory means for storing the image data;
    storing means for extracting image data of one picture plane from input motion image data and storing the extracted image data of one picture plane in said memory means;
    instructing means for manually instructing a recording of a still image; and
    control means for controlling said recording means and said storing means in a manner such that said storing means extracts image data of one picture plane from the input motion image data and stores the extracted image data of one picture plane in said memory means in response to an instruction of said instructing means during the recording of said input motion image data and said recording means records the extracted image data of one picture plane stored in said memory means as the still image after the recording of the input motion image data from which the image data of one picture plane for the still image is extracted is stopped, the image data of both picture planes preceding and following the extracted picture plane in the input motion image data being recorded onto the recording medium.

2. An apparatus according to claim 1, further comprising encoding means for encoding said image data.

3. An apparatus according to claim 2, wherein said memory means stores the image data encoded by said encoding means.

4. An apparatus according to claim 2, wherein said memory means stores the image data to be encoded by said encoding means.

5. An apparatus according to claim 1, wherein said control means controls said memory means and said recording means in a manner such that the image data of one picture plane stored in said memory means is repeatedly read out from said memory means and is repeatedly recorded as still images onto said recording medium.

6. An apparatus according to claim 1, further comprising generating means for generating first additional data in accordance with an instruction by said instructing means, and
    wherein said control means further controls said recording means so as to record said first additional data onto said recording medium in accordance with an instruction by said instructing means.

7. An apparatus according to claim 1, further comprising generating means for generating additional data, and
    wherein said control means controls said recording means so as to record said additional data onto said recording medium together with the image data stored in said memory means.

8. An apparatus according to claim 1, wherein said memory means stores said image data of a plurality of picture planes.

9. An apparatus according to claim 8, further comprising:
    detecting means for detecting the number of picture planes of said image data which can be stored into said memory means; and
    display means for displaying the number of picture planes of said image data detected by said detecting means.

10. An apparatus according to claim 9, wherein said detecting means further detects whether the number of picture planes which can be stored in said memory means is smaller than a predetermined number or not, and said display means displays a warning when said number of picture planes is smaller than said predetermined number.

11. An apparatus according to claim 1, further comprising manual instructing means for manually instructing a start and a stop of the recording of said motion image, and
    wherein said control means controls said recording means and said memory means in a manner such that the image data stored in said memory means is recorded onto said recording medium in accordance with an instruction to stop the recording of said motion image by said manual instructing means.

12. A recording apparatus comprising:
    recording means for recording image data onto a recording medium;
    memory means for storing said image data;
    storing means for extracting image data of one picture plane from input motion image data and storing the extracted image data of one picture plane in said memory means;
    first instructing means for manually instructing a recording of a still image;
    second instructing means for manually instructing a stop of a recording of a motion image, said second instructing means being functional independently of said first instructing means; and
    control means for controlling said recording means and said storing means in a manner such that said storing means extracts image data of one picture plane from input motion image data and stores the extracted image data of one picture plane in said memory means in response to an instruction of said first instructing means during the recording of the input motion image data and said recording means records the stored image data of one picture plane as the still image onto said recording medium in response to an instruction of said second instructing means given to stop said recording of the input motion image data from which the image data of one picture plane is extracted by said storing means.

13. Apparatus according to claim 12, wherein said recording means comprises coding means for coding the input motion image data and for compressing an information amount of the input motion image data, said recording means recording the coded input image data.

14. Apparatus according to claim 13, wherein said coding means codes the image data stored in said memory means.

15. Apparatus according to claim 12, wherein the image motion input data are obtained by a video camera.

16. Apparatus according to claim 12, wherein said recording means records the image data stored in the memory means as the still image data for a predetermined period of time.

17. Apparatus according to claim 12, wherein said memory means stores the image data of a plurality of picture planes extracted from the input motion image data.

* * * * *

UNITED STATES PATENT AND TRADEMARK OFFICE
CERTIFICATE OF CORRECTION

PATENT NO. : 6,243,531 B1
DATED : June 5, 2001
INVENTOR(S) : Yoshitaka Takeuchi et al.

Page 1 of 1

It is certified that error appears in the above-identified patent and that said Letters Patent is hereby corrected as shown below:

Column 5,
Line 30, "be also" should read -- also be --.
Line 37, "be" should read -- also --.
Line 38, "also" should read -- be --.
Line 65, "abovementioned" should read -- above-mentioned --.

Column 9,
Line 20, "be also" should read -- also be --.

Column 12,
Line 1, "image" should read -- input --.
Line 2, "input" should read -- image --.

Signed and Sealed this

Fifth Day of March, 2002

Attest:

Attesting Officer

JAMES E. ROGAN
Director of the United States Patent and Trademark Office